(12) United States Patent
Gu et al.

(10) Patent No.: US 10,997,835 B1
(45) Date of Patent: May 4, 2021

(54) CAMERA AND MIRROR SYSTEM WITHIN A RETAIL STORE

(71) Applicant: AiFi Corp, Santa Clara, CA (US)

(72) Inventors: Steve Gu, Santa Clara, CA (US); Ying Zheng, Santa Clara, CA (US); Tyler Crain, Oakland, CA (US)

( * ) Notice: Subject to any disclaimer, the term of this patent is extended or adjusted under 35 U.S.C. 154(b) by 0 days.

(21) Appl. No.: 16/784,245

(22) Filed: Feb. 7, 2020

(51) Int. Cl.
  *G08B 13/196*  (2006.01)
  *H04N 5/33*  (2006.01)
  *H04N 5/225*  (2006.01)

(52) U.S. Cl.
  CPC ......... *G08B 13/19641* (2013.01); *H04N 5/33* (2013.01); *H04N 5/2252* (2013.01)

(58) Field of Classification Search
  None
  See application file for complete search history.

(56) References Cited

U.S. PATENT DOCUMENTS

| | | | |
|---|---|---|---|
| 2016/0021307 A1* | 1/2016 | Warzelhan | H04N 5/23229 348/143 |
| 2018/0253708 A1* | 9/2018 | Mohanakrishnan | G06Q 20/322 |
| 2019/0205643 A1* | 7/2019 | Liu | G06K 9/00624 |

* cited by examiner

*Primary Examiner* — James M Anderson, II
(74) *Attorney, Agent, or Firm* — Jun Liu

(57) ABSTRACT

This application relates to systems, methods, devices, and other techniques for a system with cameras and mirrors that can be utilized with an auto-checkout system within a retail environment. This system with cameras and mirrors is designed to have many functions within a store with auto-checkout system and sometimes can be utilized in a store with or without human cashier.

4 Claims, 3 Drawing Sheets

US 10,997,835 B1

CAMERA AND MIRROR SYSTEM WITHIN A RETAIL STORE

BACKGROUND OF THE INVENTION

This application relates to systems, methods, devices, and other techniques for a system with cameras and mirrors that can be utilized with an auto-checkout system within a retail environment.

Methods and apparatus for using cameras in a retail store for monitoring products and customers are well known and in practices. However, systems, methods, devices, and other techniques for a system with cameras and mirrors that can be utilized with an auto-checkout system within a retail environment need is new and could be combined with recently developed AI and machine learning.

Therefore, it is desirable to have systems, methods, devices, and other techniques for a system with cameras and mirrors that can be utilized with an auto-checkout system within a retail environment

SUMMARY OF THE INVENTION

This application relates to systems, methods, devices, and other techniques for a system with cameras and mirrors that can be utilized with an auto-checkout system within a retail environment. This system with cameras and mirrors is designed to have many functions within a store with auto-checkout system and sometimes can be utilized in a store with or without human cashier.

In some embodiments, a camera system for a retail store, comprising: At least one camera, wherein the camera is coupled to a mounting portion that has a circular pedestal and is attached to a ceiling of the shop, wherein the camera is configured to detect color or depth; and At least one mirror coupled to corners of the store, wherein each of the at least one mirror is configured to be tilted with a pre-determined angle to the camera, wherein the at least one mirror is flat or curved, wherein the at least one mirror is configured to enable the camera to view a large amount of items stocked on shelves in the store, wherein the at least one camera is configured to face the mirror to monitor the store.

In some embodiments, the camera can view 360 degrees.
In some embodiments, the camera is configured to detect the depth information.
In some embodiments, the camera is configured to detect the infrared information.

In some embodiments, the invention relates to a camera system for a cylindrical-shaped retail store, comprising: a camera, wherein the camera is coupled to a mounting portion that has a circular pedestal and is attached to a ceiling of the shop, wherein the camera is configured to have a full room view, wherein the camera is configured to detect color and depth; and a curved mirror coupled to walls of the cylindrical-shaped store, wherein the curved mirror forms a circle, wherein the curved mirror is configured to be tilted with a pre-determined angle to the camera, wherein the curved mirror is configured to enable the camera to view all items stocked on shelves in the store.

In some embodiments, the camera can view 360 degrees.
In some embodiments, the camera is configured to detect the depth information.
In some embodiments, the camera is configured to detect the infrared information.

In some embodiments, the invention is related to a system for an autonomous retail store, comprising: At least one camera, wherein the camera is coupled to a mounting portion that has a circular pedestal and is attached to a ceiling of the shop, wherein the camera is configured to detect color or depth; and At least one mirror coupled to corners of the store, wherein each of the at least one mirror is configured to be tilted with a pre-determined angle to the camera, wherein the at least one mirror is flat or curved, wherein the at least one mirror is configured to enable the camera to view a large amount of items stocked on shelves in the store, wherein the at least one camera is configured to face the mirror to monitor the store; and An auto-checkout system, wherein each receipt is calculated based on camera images through the at least one mirror and processing results from Artificial Intelligence.

In some embodiments, the camera can view 360 degrees.
In some embodiments, the camera is configured to detect the depth information.
In some embodiments, the camera is configured to detect the infrared information.

These and other aspects, their implementations and other features are described in details in the drawings, the description and the claims.

DETAILED DESCRIPTION OF THE INVENTION

Figure 1:
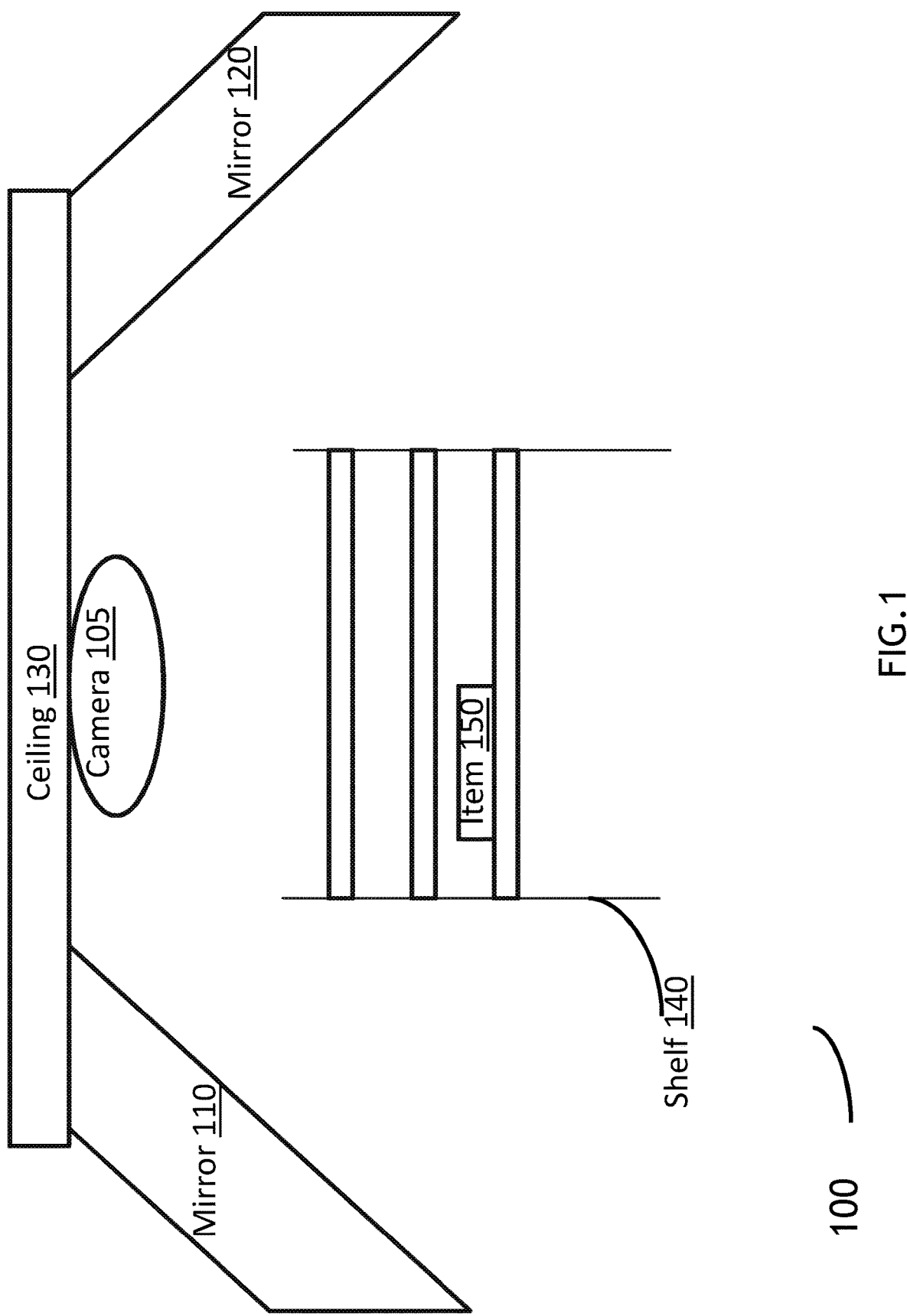
FIG. 1 shows an example of a system of cameras and mirrors in a retail environment.

FIG. 1 shows an example of a system 100 of cameras and mirrors in a retail environment.

In some implementations, the system 100 for a retail store comprises at least one camera 105, wherein the camera 105 is coupled to a mounting portion that has a circular pedestal and is attached to a ceiling 130 of the shop, wherein the camera 105 is configured to detect color or depth; and one mirror 110 and another mirror 120 coupled to corners of the store, wherein each of one mirror 110 and another mirror 120 are configured to be tilted with a pre-determined angle to the camera 105, wherein one mirror 110 and mirror 120 is flat, wherein the one mirror 110 and another mirror 120 are to enable the camera 105 to view a item 150 stocked on shelves 140 in the store, wherein the camera 105 is configured to face the mirror to monitor the store. In some embodiments, there would be multiple shelves and items.

In some embodiments, the camera 105 can view 360 degrees.
In some embodiments, the camera 105 is configured to detect the depth information.
In some embodiments, the camera 105 is configured to detect the infrared information.

Figure 2:
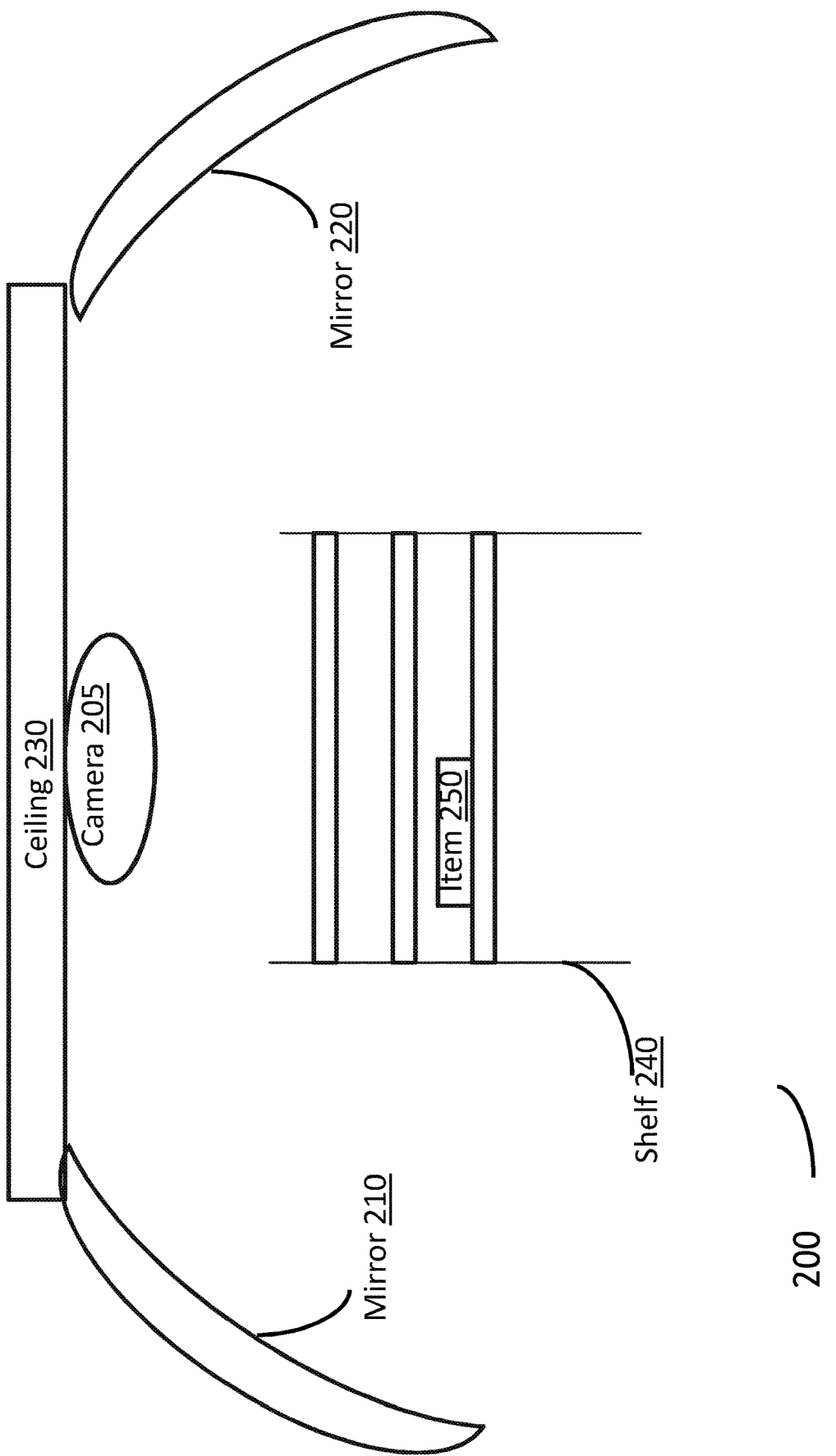
FIG. 2 shows another example of a system of cameras and mirrors in a retail environment.

FIG. 2 shows another example of a system 200 of cameras and mirrors in a retail environment.

In some implementations, the system 200 for a retail store comprises at least one camera 205, wherein the camera 205 is coupled to a mounting portion that has a circular pedestal and is attached to a ceiling 230 of the shop, wherein the camera 205 is configured to detect color or depth; and one mirror 210 and another mirror 220 coupled to corners of the store, wherein each of one mirror 210 and another mirror 220 are configured to be tilted with a pre-determined angle to the camera 205, wherein one mirror 210 and another mirror 220 is curved and can thus widen the viewing range of the mirrors, wherein the one mirror 210 and another mirror are to enable the camera 205 to view a item 250 stocked on shelves 240 in the store, wherein the camera 205 is configured to face the mirror to monitor the store. In some embodiments, there would be multiple shelves and items.

In some embodiments, the camera 205 can view 360 degrees.

In some embodiments, the camera 205 is configured to detect the depth information.

In some embodiments, the camera 205 is configured to detect the infrared information.

Figure 3:
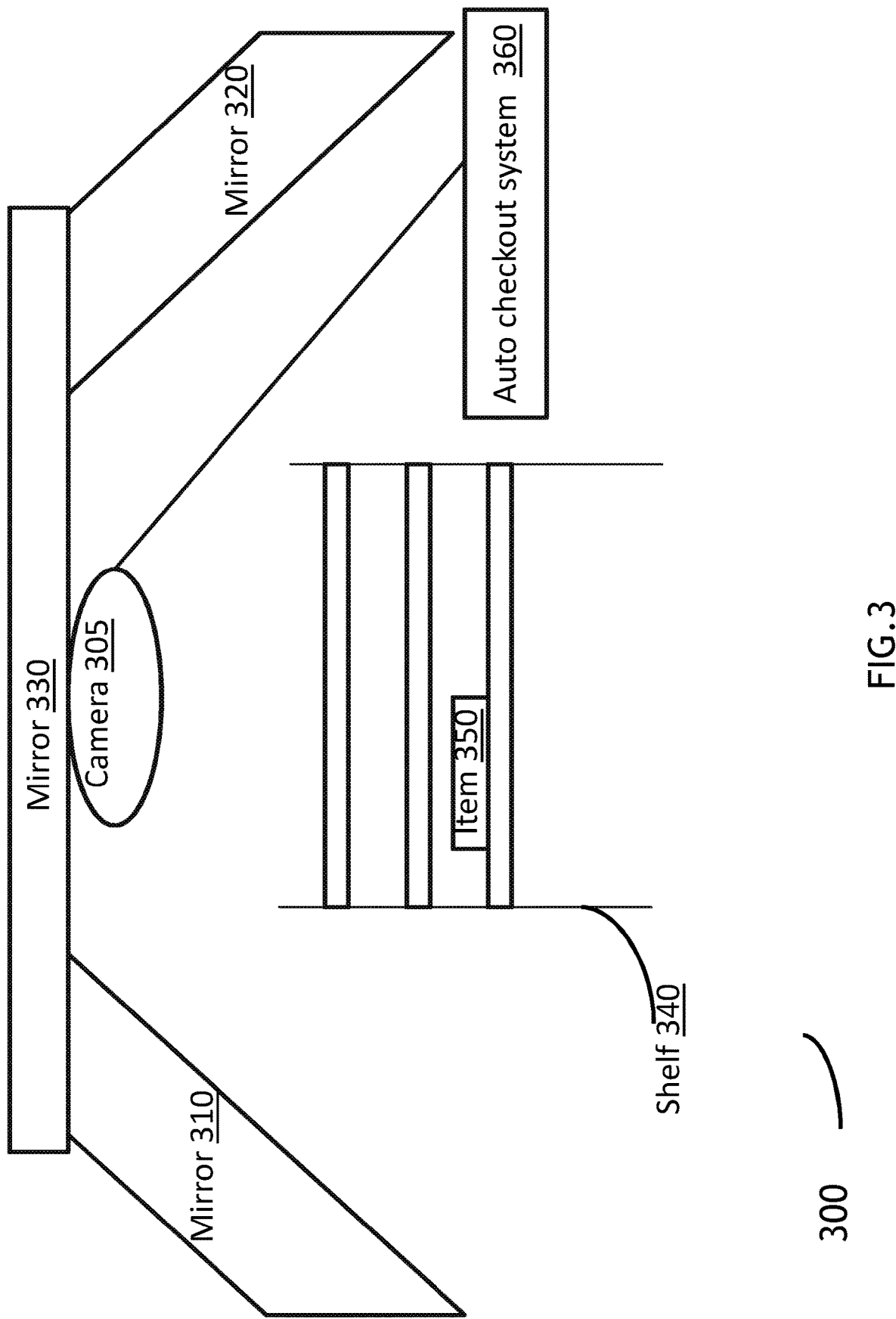
FIG. 3 shows a third example of a system of cameras and mirrors in a retail environment.

FIG. 3 shows an example of a third system 300 of cameras and mirrors in a retail environment.

In some implementations, the system 300 for a retail store comprises at least one camera 305, wherein the camera 305 is coupled to a mounting portion that has a circular pedestal and is attached to a ceiling 330 of the shop, wherein the camera 305 is configured to detect color or depth; and one mirror 310 and another mirror 320 coupled to corners of the store, wherein each of one mirror 310 and another mirror 320 are configured to be tilted with a pre-determined angle to the camera 305, wherein one mirror 310 and another mirror 320 are flat or curved, wherein the one mirror 310 and another mirror 320 are to enable the camera 305 to view a item 350 stocked on shelves 340 in the store, wherein the camera 305 is configured to face the mirror to monitor the store. In some embodiments, there would be multiple shelves and items. In some embodiments, an auto checkout system 360 is coupled to the camera 305 and the auto checkout system is working within the retail shop.

In some embodiments, the camera 305 can view 360 degrees.

In some embodiments, the camera 305 is configured to detect the depth information.

In some embodiments, the camera 305 is configured to detect the infrared information.

The invention claimed is:

1. A camera system for a cylindrical-shaped-retail store, comprising:

A camera, wherein the camera is coupled to a mounting portion that has a circular pedestal and is attached to a ceiling of the cylindrical-shaped retail store, wherein the camera is configured to detect color and depth, wherein the camera is configured to view 360 degrees; and A curved mirror coupled to walls of the cylindrical-shaped store, wherein the curved mirror forms a circle, wherein the curved mirror is configured to enable the camera to have a full room view via shape of the curved mirror, wherein the curved mirror forms multiple viewing angles to the camera via the shape of the curved mirror, wherein the curved mirror is configured to form multiple mirror images of an item via the multiple viewing angles, wherein the curved mirror is configured to enable the camera to view the item and the multiple mirror images of the item.

2. The camera system for a retail store of claim 1, wherein the camera can view 360 degrees.

3. The camera system for a retail store of claim 2, wherein the camera is configured to detect the depth information.

4. The camera system for a retail store of claim 3, wherein the camera is configured to detect the infrared information.

* * * * *